F. KAUFLER & A. KLAGES.
MERCURIC CHLORID AND PROCESS OF PRODUCING SAME.
APPLICATION FILED AUG. 27, 1912.
1,084,346.
Patented Jan. 13, 1914.
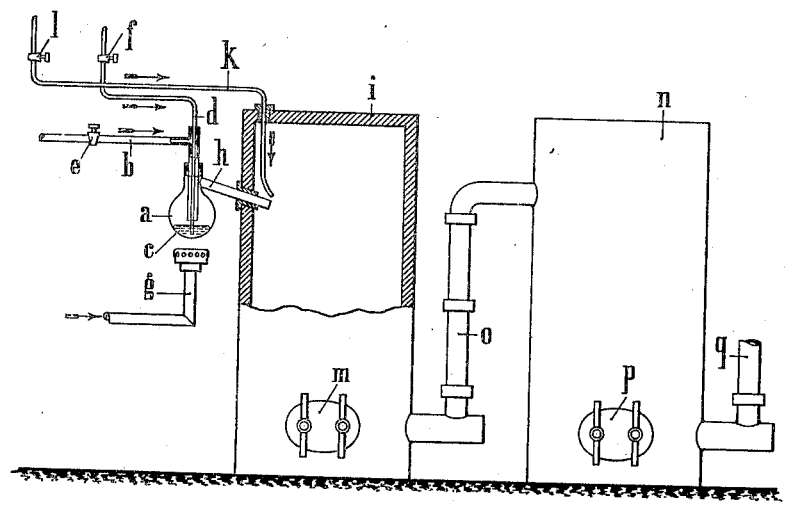
Witnesses:
John E. Prager
A. Worden Gibbs
Inventors
Felix Kaufler
August Klages
By their Attorney
Fred'k F. Schuetz

UNITED STATES PATENT OFFICE.

FELIX KAUFLER, OF VIENNA, AUSTRIA-HUNGARY, AND AUGUST KLAGES, OF SALBKE, GERMANY.

MERCURIC CHLORID AND PROCESS OF PRODUCING SAME.

1,084,346. Specification of Letters Patent. Patented Jan. 13, 1914.

Application filed August 27, 1912. Serial No. 717,246.

*To all whom it may concern:*

Be it known that we, FELIX KAUFLER, a subject of the Emperor of Austria-Hungary, and resident of Vienna, in the Empire of Austria-Hungary, and AUGUST KLAGES, a subject of the German Emperor, King of Prussia, and resident of Salbke, in the Province of Saxony, Kingdom of Prussia, German Empire, have invented new and useful Improvements in Mercuric Chlorid and Processes of Producing Same, of which the following is a full, clear, and exact specification.

Our invention relates to mercury bichlorid prepared by direct action of chlorin on mercury, a product being obtained which has special valuable properties.

Generally, mercury bichlorid is prepared by the wet process by decomposing mercury sulfate by means of sodium chlorid or hydrochloric acid and purifying the mercury bichlorid thus obtained by crystallization or sublimation. The preparation of mercury bichlorid by direct combination of mercury and chlorin, which process appears to be much more simple, has not proved of any technical value up to date. According to Thomson's investigations this is due to the fact that it is not possible to entirely avoid the formation of mercury monochlorid and a further reason may be this, that there is no material suitable for making the retorts in which the reaction is performed. Further, the process allows only of relatively small quantities of mercury and chlorin to be brought to reaction in the apparatus.

The process of preparing mercury bichlorid by sublimation by the dry way is lengthy, costly and detrimental to health. (See Muspratt, *Handbuch der Technischen Chemie*, Vol. VII, p. 586, 1900.) If, for instance, mercury is heated to boiling in a glass retort and chlorin introduced, it is impossible, or only possible with excessive difficulties, to regulate the admission of chlorin so as to obtain a mercury bichlorid free from monochlorid. Indeed, the bichlorid which is distilled off, forms a solid yellowish mass, which very often contains chlorin and must be specially purified and pulverized in order to obtain a commercial product.

Now, according to this invention the process of burning mercury in a current of chlorin can be continuously carried on by constantly admitting fresh quantities of mercury to the chlorin flame burning above the boiling mercury level. This is performed by allowing the mercury which is preferably heated preliminarily by the chlorin flame to enter below the level of the boiling mercury. It is preferable to perform the process in a vessel of quartz or quartz glass or to use, in view of the high temperature, quartz admission tubes for both the mercury and the chlorin. When the process is carried on in this way, it is possible to continuously maintain the reaction which may be assisted by gentle heating, the whole reaction vessel being filled with a brilliant green flame. The bichlorid thus formed drips off as a thin liquid, colorless distillate which very soon solidifies.

According to a modification of our invention the mercury bichlorid formed by the burning process can be transformed into a finely divided state, the troublesome pulverization of the solid mass being thus avoided. For obtaining this result the mercury bichlorid vapors are allowed to escape from the retort to a large tower, in which they are chilled with cold air. By this treatment the vapors become instantaneously solidified in the form of fine voluminous needles which are absolutely pure and free from mercury monochlorid, especially if a small percentage of chlorin, generally not exceeding about 10 per cent., is mixed with the air current. The air current may be introduced into the apparatus by suction or by pressure. In the first case the suction existing in the whole apparatus secures safety of the operation. The mercury bichlorid thus obtained is chemically pure and of brilliant white color. It is much more voluminous than the product obtained by other operations. While 1 liter of ordinary powdered mercury bichlorid weighs 2800 g., 1 liter of mercury bichlorid obtained by the present process weighs only 1400 g. This property is of special value, firstly because the mercury bichlorid thus obtained is specially suitable for dispensing in pharmacies, and secondly because, it is much more rapidly soluble than the ordinary powdered commercial product. Therefore, the new results obtained by the present process are the following: 1. Production of mercury bichlorid in a continuous uniform operation. 2. Obtaining of a brilliant white voluminous crystalline powder, which in view of the absence of all organic impurities retains its excellent properties also under the action of light, which is rapidly soluble and especially suitable for dispensing in pharmacies in view of its voluminous qualities. 3. The possibility of using a small closed apparatus which is easy to survey and prevents the escape of mercury bichlorid vapors and therefore any danger for the workman, the bichlorid being obtained as a finished commercial product, without requiring crystallization, sublimation or drying of the poisonous substance.

In the accompanying drawing the apparatus, which is used in carrying out the process according to this invention, is represented in a side elevation partly in section.

$a$ is the retort preferably consisting of quartz glass and provided with a chlorin admission tube $b$ ending above the level of the mercury $c$ contained in the retort, and a mercury admission tube $d$ terminating below the level of said mercury. Both tubes $b$ and $d$, are also preferably made of quartz. As shown in the drawing, the mercury admission tube $d$ can be disposed within the chlorin admission tube $b$, the mercury flowing through the tube $d$ being thus preliminarily heated by the chlorin flame burning at the open end of the tube $b$, before said mercury enters the mass of mercury $c$. Both tubes may be provided with suitable valves $e$ and $f$ for regulating the admission of the chlorin and mercury, respectively. The retort is heated by suitable means. In the drawing a gas burner $g$ is shown, which may be of any desired construction. Other heating devices, for instance electric heating appliances, may be used. The mercury bichlorid formed in the retort escapes through the outlet tube $h$ into a large tower $i$, which may be of any suitable material which is not attacked by the mercury bichlorid vapors. In practice we have found it preferable to use glazed acid-proof bricks. Into this tower air is admitted by means of a tube $k$ provided with a suitable regulating valve $l$, the air being preferably mixed, as already explained, with a small percentage of chlorin, not exceeding say 10%. The tube $k$ preferably terminates near the end of the outlet tube $h$. Thus the air becomes mixed with the mercury bichlorid vapors and the latter are chilled and transformed into crystalline needles, as above explained. The deposited mercury bichlorid crystals may be removed through a man-hole provided with a suitable cover $m$.

In order to prevent any loss of mercury bichlorid it is preferable, though not absolutely necessary, to provide a second tower $n$ connected to the tower $i$ by means of a tube $o$. The tower $n$ may also be provided with a man-hole and cover $p$. In this tower, which may be made of clay, the last traces of mercury bichlorid are deposited. The apparatus is further provided with a tube $q$ connected with a suitable suction device. Generally it will be sufficient to connect the tube $q$ with a chimney. As already explained, it is not absolutely necessary to provide suction devices, as the gases may also be introduced by pressure.

We do not limit ourselves to the details given, which may be varied in practice without departing from the scope of the invention.

What we claim is:

1. A process of preparing mercury bichlorid, said process consisting in separately introducing chlorin and mercury into a retort containing boiling mercury, the mercury being introduced below the level of the boiling mercury.

2. A process of preparing mercury bichlorid, said process consisting in separately introducing chlorin and mercury into a retort containing boiling mercury, the mercury being introduced below the level of the boiling mercury and preliminarily heated by the chlorin flame burning above the mercury level.

3. A process of preparing mercury bichlorid, said process consisting in separately introducing chlorin and mercury into a retort containing boiling mercury and chilling the mercury bichlorid vapors escaping from the retort with large quantities of cold air.

4. A process of preparing mercury bichlorid, said process consisting in separately introducing chlorin and mercury into a retort containing boiling mercury, the mercury being introduced below the level of the boiling mercury, and chilling the mercury bichlorid vapors escaping from the retort with large quantities of cold air.

5. A process of preparing mercury bichlorid, said process consisting in separately introducing chlorin and mercury into a retort containing boiling mercury, the mercury being introduced below the level of the boiling mercury and preliminarily heated by the chlorin flame burning above the mercury level and chilling the mercury bichlorid vapors escaping from the retort with large quantities of cold air.

6. A process of preparing mercury bichlorid, said process consisting in separately introducing chlorin and mercury into a retort containing boiling mercury and chilling the mercury bichlorid vapors escaping from the retort with large quantities of cold air, containing a small percentage of chlorin.

7. A process of preparing mercury bichlorid, said process consisting in separately introducing chlorin and mercury into a retort containing boiling mercury, the mercury being introduced below the level of the boiling mercury, and chilling the mercury bichlorid vapors escaping from the retort with large quantities of cold air, containing a small percentage of chlorin.

8. A process of preparing mercury bichlorid, said process consisting in separately introducing chlorin and mercury into a retort containing boiling mercury, the mercury being introduced below the level of the boiling mercury and preliminarily heated by the chlorin flame burning above the mercury level and chilling the mercury bichlorid vapors escaping from the retort with large quantities of cold air containing a small percentage of chlorin.

9. As a new article of manufacture, chemically pure mercury bichlorid forming fine voluminous crystalline needles, one liter of which weighs substantially 1400 grams.

In testimony, that we claim the foregoing as our invention, we have signed our names in presence of two subscribing witnesses.

DR. FELIX KAUFLER.
AUGUST KLAGES.

Witnesses to the signature of Felix Kaufler:

AUGUST FRUGGER,
ADA M. BERGER.

Witnesses to the signature of August Klages:

ERWIN KOSTENBADER,
JOHANNES P. GOOHS.

---

Copies of this patent may be obtained for five cents each, by addressing the "Commissioner of Patents, Washington, D. C."